June 11, 1968     J. WOELLHAF ET AL     3,387,322

APPARATUS FOR THE PRODUCTION OF HOMOGENEOUS SHEETING

Filed Aug. 17, 1965     2 Sheets-Sheet 1

INVENTORS:
JOSEF WOELLHAF
HERBERT WAGNER
WILHELM UHL
OTTO HEDDERICH

BY: *Marzall, Johnston, Cook & Root*

ATT'YS

INVENTORS:
JOSEF WOELLHAF
HERBERT WAGNER
WILHELM UHL
OTTO HEDDERICH

United States Patent Office 3,387,322
Patented June 11, 1968

3,387,322
APPARATUS FOR THE PRODUCTION OF
HOMOGENEOUS SHEETING
Josef Woellhaf and Herbert Wagner, Ludwigshafen (Rhine), Wilhelm Uhl, Frankenthal, Pfalz, and Otto Hedderich, Schifferstadt, Pfalz, Germany, assignors to Badische Anilin- & Soda-Fabrik, Aktiengesellschaft, Ludwigshafen (Rhine), Germany
Filed Aug. 17, 1965, Ser. No. 480,347
Claims priority, application Germany, Aug. 19, 1964, B 78,163
3 Claims. (Cl. 18—2)

ABSTRACT OF THE DISCLOSURE

Apparatus for the production of homogeneous calendered thermoplastic sheeting embodying a plurality of superposed parallel rollers with gaps therebetween, a reciprocal blade at the gap of the uppermost rollers for removing thermoplastic material from the last gap and returning it to the material fed to the gap between the two lowermost rollers.

---

Figure 1:
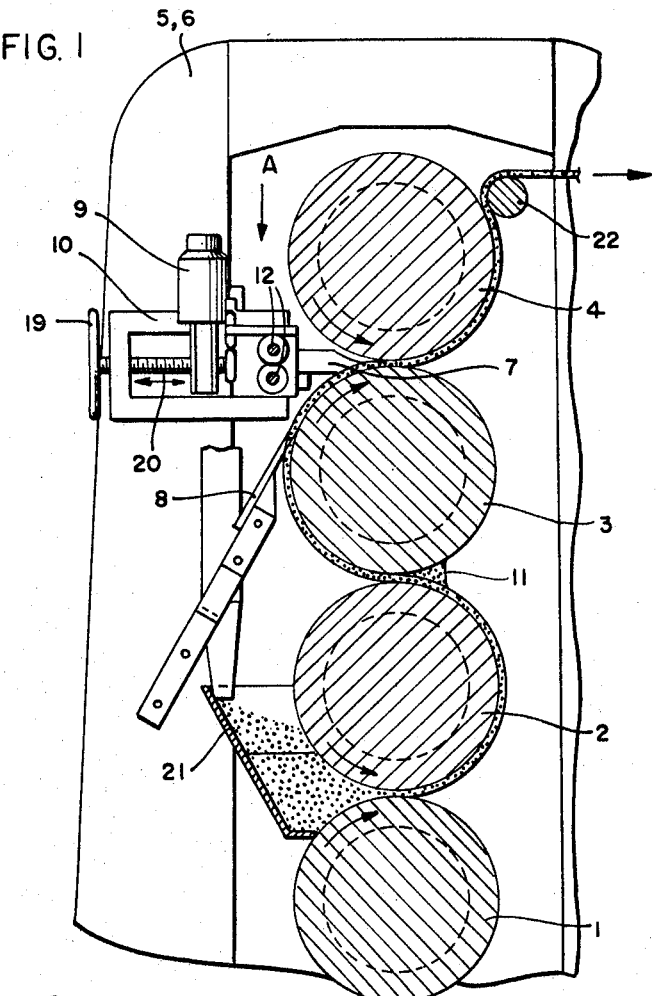

This invention relates to an apparatus for the production of homogeneous sheeting from thermoplastics. The invention relates particularly to the production of sheeting of polyvinyl chloride in a calender having a plurality of rollers arranged one above the other.

It is known that rigid polyvinyl chloride (PVC) sheeting can be prepared by means of a calender. For this purpose, the PVC is mixed with a small amount of wax and preplasticized on a heated two-roll mill. The mixture of PVC and wax is rolled out to sheeting in the calender. The sheeting is then heated for a short time at high temperature, cooled again and finally wound up or stretched.

The unstretched sheeting may be used for example as deep drawing sheeting or for packaging. Stretched rigid PVC sheeting is used in the adhesive tape industry or as backing for magnetic recording tapes.

When used as recording tape, the sheeting has to satisfy particularly high requirements. It must have good dimensional stability and its thickness tolerances have to be small. Furthermore the sheeting should be prepared homogeneously, i.e. it should not contain stripes or streaks.

Dimensional stability, i.e. stiffness, strength and an adequate high modulus of elasticity are provided by the initial material in the case of rigid PVC sheeting in contrast to plasticized PVC sheeting.

The two last-mentioned conditions, namely small thickness tolerances and homogeneity of the sheeting, require great practical experience on the part of the manufacturer when thin sheeting having a thickness of up to about 40 microns is being made. The production of sheeting having constant thickness is difficult at thickness of more than 0.04 mm.

The reason for this lies in the calendering process itself. In the production of sheeting, for example PVC having a K-value of 75 (according to H. Fikentscher, Zellulosechemie 13 (1932), p. 58) is mixed with about 2% of wax, is preplasticized on a two-roll mill or in an extruder and is introduced into the calender. It is necessary to break up the raw material. It should not be introduced into the calender in the form of so-called "billets," i.e. rolls of rough sheet because if it is introduced in this form the pressure differences in the rolling gaps between the rollers are too great and this becomes evident later an unequal thicknesses in the sheeting.

The mixture, after it has been reduced in size, is accordingly passed by means of conveying means into the calender opening formed by the gap between the first and second rollers and a feed plate mounted in front of the said gap. The mixture then passes into the first gap between the first and second rollers where it is kneaded and rolled out under high pressure. The plastic deformation of the material in the gap may be intensified by rotating the two rollers at different speeds.

The second gap, between the third and fourth rollers, to which the rolled material passes for further deformation, is narrower than the first gap. Excess material therefore builds up in front of the second gap and forms an accumulation. An accumulation also forms in front of the third gap in the calender. This last gap between the two upper rollers is decisive for the properties of the sheeting. The surface of the last two rollers should therefore be highly polished.

The accumulation which forms here increases in size in time and is forced out from the gap. It thus cools, some of it to below the softening temperature of the material. When individual portions of the accumulated material become so large and heavy that they break off and fall, they collect in the calender opening and are fed again into the first gap. If they do not break off, however, they are drawn into the the last gap again after some time and are mixed in the cooled condition with the warmer material. The residence time in the gap is insufficient, however, for the cold accumulated material to be brought again to the temperature of the remaining hot material. Inhomogeneous spots, stripes or streaks with air inclusions are thus formed in the finished sheeting.

The cold and therefore very hard portions of the accumulated material which are drawn back into the last gap create zones of different high pressure in all calendered sheeting, irrespective of the thickness of the sheeting. These differences in pressure make the upper rollers move up and down in their bearings, i.e. they cause variations in the width of the gap which result in sheeting having very irregular thickness.

It is the object of the present invention to provide an apparatus for producing sheeting having constant thickness in all parts. Another object of the invention is to provide a process by which accumulation of excess material in front of the uppermost roller gap of a calender having a plurality of rollers is avoided.

The apparatus for the production of plastics sheeting having constant thickness over the whole length and breadth of the strip of sheeting comprises according to this invention introducing the mixture of plastic and any additives into the gap between the lowermost roller and the second roller, kneading and rolling out the mixture under high pressure in this first gap, passing it round the second roller to the second gap between the second and third rollers, passing it round all the following rollers and gaps and withdrawing it from the last gap, the excess of plastic accumulating in front of the last gap being continuously cut off, removed to the side and supplied to the first gap.

Apparatus for making sheeting in accordance with this invention comprises two parallel frame members, four rollers arranged one above the other and parallel to one another and mounted between the two frame members, a blade capable of being moved between the two uppermost rollers parallel to the axis of the rollers so as to completely fill the gap, two axles one above the other and parallel to the uppermost gap to guide the blade, means for moving the blade towards both sides, means for moving the blade in the direction of the gap, a stripping plate for taking up the excess of plastic which is cut off and a feed hopper between the two lowermost rollers.

For continuous operation, a gear motor is used having a reciprocating endless chain for reciprocating movement of the blade and for regulation means adjustable perpendicularly to the roller axis is provided for holding the two axles of the chain and gear motor.

The sheeting is prepared in a rolling apparatus having a plurality of rollers arranged one above the other and driven by variable speed motors. According to this invention, the excess of plastics material forming in front of the last roller gap is continuously cut off, removed to the side and supplied to the first roller gap.

By the said apparatus, the excess in the uppermost calender gap is cut off and the quality of the sheeting is considerably improved. Fluctuations in the thickness of the sheeting are decreased to about half because the roller pressure remains constant since inhomogeneous or hard constituents are lacking. Stripes and streaks are therefore entirely obviated because cold and hard accumulated material no longer occurs in the gap.

Figure 2:
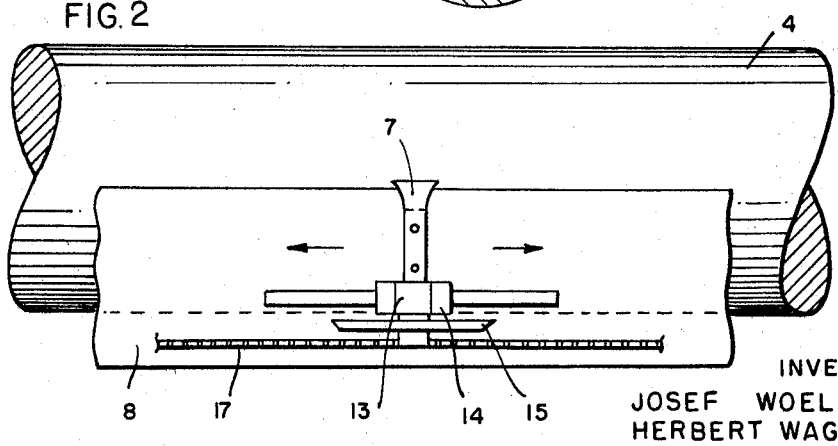

The invention will now be described in greater detail with reference to the accompanying drawings, in which apparatus according to this invention is shown by way of example. FIGURE 1 illustrates the calender framework with the clearing means in side elevation, FIGURE 2 is a plan in the direction of the arrow A in FIGURE 1, and FIGURE 3 is a front view.

The apparatus is mounted on the calender. The latter comprises two multipart frame members 5 and 6 between which the rollers 1 to 4 are mounted. The rollers are parallel to each other and are carried one above the other in bearings in the two frame members 5 and 6. The gaps between the individual rollers may be varied by moving the bearings vertically. Rollers 1 to 4 are driven individually by variable-speed motors.

Figure 3:
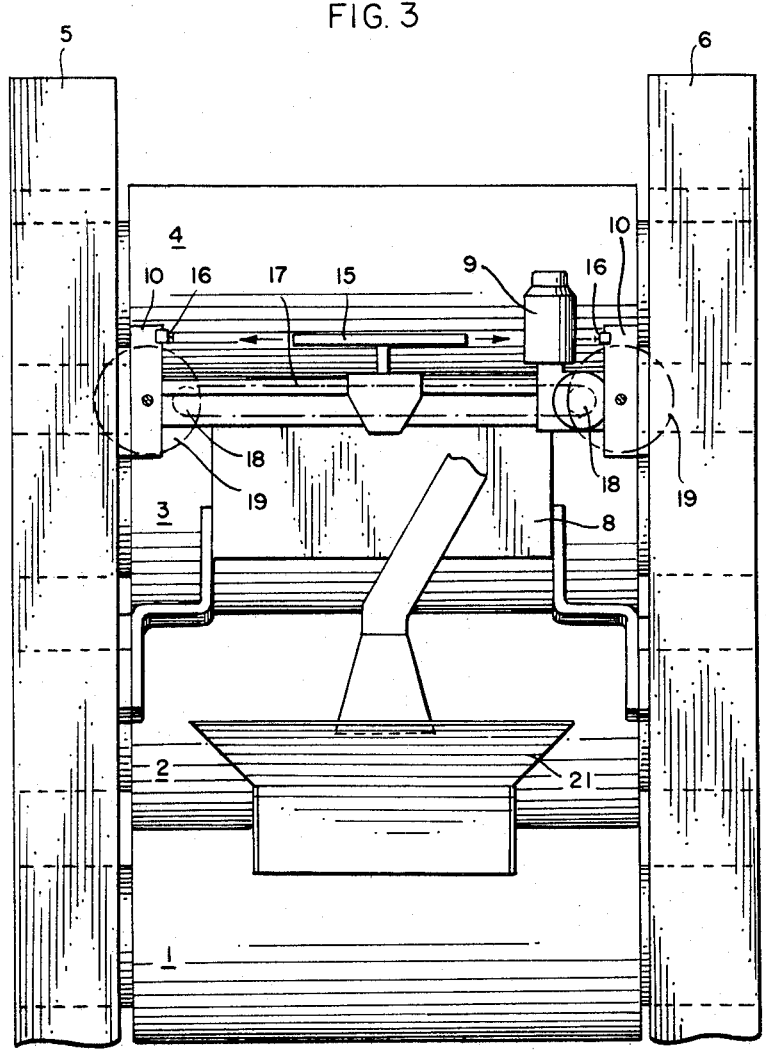

The clearing means comprises a two-edged clearing blade 7 having a run-off plate 8, a drive 9 and two adjusting members 10 (FIGURES 1 and 3).

The clearing blade 7 which is accurately adapted to the outer surface of the roller is secured in the adjusting member 10 to remove the excess material. The excess material stripped off is received by the run-off plate 8 which is secured to the frame members 5 and 6 and adapted to the outer surface of the roller. A sliding member serves for the advance movement of the clearing blade 7 in axial direction and also to receive the forces occurring perpendicularly to the advance movement. The sliding means is mounted on two axles 12 and comprise a small upper bearing 13 for the reception of a ball socket and a larger lower bearing 14 for the reception of two ball sockets, to ensure reliable axial movement of the clearing blade 7 by a three-point support (FIGURE 2). A switch fork 15 is secured to the sliding means and this limits the stroke and initiates the advance and return movement of the clearing means via two terminal switches 16 provided on the adjusting means 10.

A gear motor 9 mounted at the right-hand adjusting means effects the reciprocating movement of the clearing means through a roller chain 17 and two sprockets 18. In order that the clearing means may be adapted to every thickness of sheeting and consequently to any amount of excess material, the clearing means together with its drive 9 and the terminal switches 16 is capable of horizontal and vertical adjustment relatively to the rollers 3 and 4 by handwheels 19 and threaded spindles 20 of the adjusting members 10.

The entire clearing means is secured to the two frame members through the two horizontal adjusting means 10.

In operation, the excess material 11 is stripped off by the clearing means and passed outwardly to the ends of the roller 3, received by the run-off plate 8 and returned to the feed hopper 21 between the rollers 1 and 2 whence the material is resupplied to the calender and discharged from the rollers 1 to 4 by means of a roller 22 in the form of sheeting.

Removing the excess material from the roller gap is possible not only with the clearing means described, but other means, such as clearing screws, chain clearing means or similar clearing units are also suitable.

The invention is further illustrated by the following examples.

*Example 1.—Stretched calendered sheeting having a thickness of 34 microns*

Emulsion PVC having a K-value of 75 is mixed with 3% of montan wax and rolled out on a two-roll mill at 145° C.

The thickness of the unstretched sheeting after leaving the calender is about 75 microns.

At a rolling speed of 10 meters per minute, the temperatures at calender rollers 1 to 4 are 155°, 155°, 160° and 162° C.

The temperature of the melt roller in the stretching machine is 245° C., the stretching temperature is 110° C. and the stretch is 300%.

PVC sheeting having a thickness of 34 microns produced under these conditions has variations in thickness of 5%.

By making the sheeting under otherwise the same conditions, but using the clearing means according to the invention, the fluctuation in thickness is only 2%.

*Example 2.—Unstretched calendered sheeting having a thickness of 140 microns*

Emulsion PVC having a K-value of 75 is mixed with 2% of montan wax and rolled out at 145° C. by means of a two-roll mill. At a rolling speed of 8 meters per minute, the calender rollers have temperatures of: 155°, 155°, 160° and 165° C.

The temperature of the melt roller in the stretching machine is 245° C. The unstretched sheeting having a thickness of 140 microns contains stripes and streaks.

By adopting the same conditions, but using a clearing means according to this invention, the sheeting obtained is completely free from stripes and streaks.

We claim:
1. Apparatus for the production of homogeneous calendered sheeting comprising two parallel frame members, four superposed parallel rollers mounted between the two frame members, a blade mounted to be displaceable between the two uppermost rollers parallel to the rollers and completely filling the gap, two shafts mounted one above the other parallel to the uppermost gap for guiding the blade, motor means for reciprocating the blade from one side to the other, means for moving the blade in the direction of the gap, a stripping plate for the reception of the excess material cut off and a feed hopper between the two lowermost rollers.

2. Apparatus for the production of homogeneous calendered sheeting comprising two parallel frame members, four superposed parallel rollers mounted between the two frame members, a blade mounted to be displaceable between the two uppermost rollers parallel to the rollers and completely filling the gap between them, two shafts mounted one above the other parallel to the uppermost gap for guiding the blade, a gear motor and a reciprocating endless chain for continuous reciprocation of the blade, holding means for the two shafts the chain and the gear motor and capable of adjustment perpendicular to the axis of the rollers, a stripping plate to receive the excess material cut off and a feed hopper between the two lowermost rollers.

3. Apparatus for the production of homogeneous, calendered thermoplastic sheeting which comprises a plurality of superposed, rotatably driven rollers with narrow gaps therebetween, means for introduction of a thermoplastic polymer composition into the gap between the lowermost roller and its next adjacent roller for kneading and forming a sheet from said composition, the resultant sheet being conveyed by said next roller and one or more rollers thereabove to a gap between the uppermost roller and the roller immediately therebelow, reciprocal blade means for continuously cutting off excess thermoplastic polymer composition being conveyed to said last mentioned gap by said last mentioned roller for removal of excess polymer composition in front of the last mentioned gap, and means for supplying the removed, excess polymer composition to said first-mentioned means.

References Cited

UNITED STATES PATENTS

| | | |
|---|---|---|
| 1,131,275 | 3/1915 | Roper. |
| 1,340,234 | 5/1920 | Little. |
| 1,637,784 | 8/1927 | Oyler. |
| 1,876,712 | 9/1932 | Maynard. |
| 1,923,027 | 8/1933 | Stevens. |
| 2,258,659 | 10/1941 | Mosler. |
| 2,779,387 | 1/1957 | Schairer. |

FOREIGN PATENTS 1,443,812   3/1966   France.

WILLIAM J. STEPHENSON, *Primary Examiner.*

ROBERT F. WHITE, *Examiner.*

G. AUVILLE, *Assistant Examiner.*

Disclaimer 3,387,322.—*Josef Woellhaf* and *Herbert Wagner*, Ludwigshafen (Rhine), *Wilhelm Uhl*, Frankenthal, Pfalz, and *Otto Hedderich*, Schifferstadt, Pfalz, Germany. APPARATUS FOR THE PRODUCTION OF HOMOGENEOUS SHEETING. Patent dated June 11, 1968. Disclaimer filed Dec. 8, 1971, by the assignee, *Badische Anilin- & Soda-Fabrik Aktiengesellschaft*.

Hereby enters this disclaimer to claim 3 of said patent.

[*Official Gazette June 27, 1972.*]